United States Patent [19]

Kosugi

[11] Patent Number: 4,633,118
[45] Date of Patent: Dec. 30, 1986

[54] PIEZOELECTRICALLY ACTUATED HIGH-SPEED MICROWAVE SWITCH

[75] Inventor: Yuhei Kosugi, Tokyo, Japan

[73] Assignee: NEC Corporation, Japan

[21] Appl. No.: 737,626

[22] Filed: May 23, 1985

[30] Foreign Application Priority Data

May 28, 1984 [JP] Japan ................................ 59-108099

[51] Int. Cl.$^4$ ............................................ H01L 41/08
[52] U.S. Cl. .................................... 310/328; 200/181
[58] Field of Search ......... 310/328,330, 331; 200/181

[56] References Cited

U.S. PATENT DOCUMENTS

| | | | |
|---|---|---|---|
| 4,435,666 | 3/1984 | Fukui .................... | 310/328 |
| 4,454,442 | 6/1984 | Hosking ................ | 310/328 |
| 4,518,887 | 5/1985 | Yano et al. ............ | 310/328 |
| 4,538,087 | 8/1985 | Germano et al. ....... | 310/331 X |
| 4,547,086 | 10/1985 | Matsumoto et al. ..... | 310/328 X |

*Primary Examiner*—Mark O. Budd
*Attorney, Agent, or Firm*—Sughrue, Mion, Zinn, Macpeak, and Seas

[57] ABSTRACT

A microwave switch with mechanical contacts which is applicable to a microwave band or a millimeter-wave band and shortens a switching time. An axial displacement of an electroexpansive element (36) caused by a voltage which is applied from the outside is magnified by two levers ($38_1$, $38_2$). A pair of leaf springs ($48_1$, $48_2$) are moved parallel to and in opposite directions to each other responsive to the magnified displacement of the electroexpansive element (36), so that a connecting member (50) which is connected to the leaf springs ($48_1$, $48_2$) is driven in a rotational motion. In response to the rotational motion of the member (50), another leaf spring (52) connected to the member (50) moves two movable rods ($31_1$, $32_2$) and, thereby, center conductors ($30_1$, $30_2$) carried respectively by the rods ($32_1$, $32_2$) in opposite directions to each other. This allows a stationary common contact ($28_2$) to be selectively connected to stationary selection contacts ($28_1$, $28_2$).

15 Claims, 15 Drawing Figures

PIEZOELECTRICALLY ACTUATED HIGH-SPEED MICROWAVE SWITCH

BACKGROUND OF THE INVENTION

The present invention relates to a microwave switch suited to a communications apparatus and operable in a microwave band or a millimeter-wave band and, more particularly, to a microwave switch with mechanical contacts which cuts down power consumption and heat generation and operates with desirable reliability and a minimal switching time.

Among switches applicable to the microwave band, those which are much in demand and of prime importance are the switches adapted to select either a regular equipment or a protection equipment at a communications station. Switches for such an application are required to feature small loss and high isolation between non-connected terminals and, for this reason, mostly comprise switches having mechanical contacts instead of those using semiconductive switching elements. As generally accepted, the microwave band covers frequencies from 1 GHz to over 10 GHz, while frequencies higher than 18 GHz are usually referred to as a quisemillimeter-wave or millimeter-wave band. What is requied of those switches which are designed for high frequency applications is that they entail a minimum of discontinuity in the signal transmission path and, hence, their freedom in regard to the contact structure is limited.

Traditionally, the mechanical contacts of such microwave switches were driven by electromagnetic actuators. An electromagnetic actuator is an electromechanical energy transducer which is called a solenoid and has long been used to show acceptable performance and reliability. Today, however, electromagnetic actuators cannot meet the state-of-the-art demands, particularly the ever increasing demands for small-size configuration and low power consumption in communications apparatus art as well as for a shorter switching time which is concomitant with the increasing trend toward digital communications.

Specifically, the problem with electromagnetic actuators is the power consumption and heat generation due to copper or ohmic losses of their windings. This problem has almost no chance to be provided with a solution. Although power consumption may be cut down by using a winding having a relatively large diameter, such an approach would result in slower switching and, in addition, a more bulky configuration which is contradictory to the demand for reduction in size. Another possible approach for power saving is reducing the amount of motion of a movable part of the actuator (hereinafter refered to as an armature). However, such would translate into a decrease in contact gap and, thereby, a decrease in isolation beyond a required one. Further, while reducing the force exerted by the actuator may lead to a decrease in power consumption, it would bring about shortage in contact pressure which in turn would limit the reliability of operation.

Another factor which limits the applicable range of a microwave switch used with an electromagnetic actuator is the switching speed. The switching speed cannot be enhanced beyond a certain limit partly because the electric time constant is large due to the use of a winding having a substantial inductance, and partly because the mechanical time constant is also large due to the use of an armature made of a magnetic material which has a large mass and inertia moment, and a relatively weak spring. In parallel with the recent transition of the communications principle from analog to digital, the switching time of microwave switches have come to be discussed as a critical problem. In digital communications, omission of signals due to switching is apt to occur and, in this respect, the switches should operate as fast as possible. Switches of the kind using PIN diodes and other semiconductors, although operable at high speeds, involve great insertion losses and low isolations and are, in many cases, unusable.

SUMMARY OF THE INVENTION

It is therefore an object of the present invention to provide a mechanical high-speed microwave switch which remarkably shortens the switching time.

It is another object of the present invention to provide a mechanical high-speed microwave switch which cuts down power consumption and enhances reliability of operation.

It is another object of the present invention to provide a generally improved mechanical high-speed microwave switch.

A microwave switch for selectively connecting a first selection terminal and a second selection terminal to a common terminal of the present invention comprises a first stationary selection contact and a second stationary selection contact which respectively constitute the first and second selection terminals, a stationary common contact constituting the common terminal which is located between the first and second stationary selection contacts, a first movable center conductor and a second movable center conductor located respectively between the common contact and the first selection contact and between the common contact and the second selection contact for shorting the stationary common contact and one of the first and second selection contacts, a first movable rod and a second movable rod for carrying respectively the first and second center conductors, an electroexpansive element which is variable in length responsive to a voltage applied from the outside, a first lever and second lever for magnifying a displacement of the electroexpansive element, a first flexible member and second flexible member mounted respectively on ends of the first and second levers in parallel to and opposing each other, a connecting member for connecting nearby ends of the first and second flexible members and displaceable in a rotational motion responsive to a displacement of the flexible members, and a movable rod driving member for moving the first and second movable rods in opposite directions to each other responsive to the rotational motion of the connecting member.

In accordance with the present invention, a microwave switch with mechanical contacts which is applicable to a microwave band or a millimeter-wave band and shortens a switching time is provided. An axial displacement of an electroexpansive element caused by a voltage which is applied from the outside is magnified by two levers. A pair of leaf springs are moved parallel to and in opposite directions to each other responsive to the magnified displacement of the electroexpansive element, so that a connecting member which is connected to the leaf springs is driven in a rotational motion. In response to the rotational motion of the member, another leaf spring connected to the member moves two movable rods and, thereby, center conductors carried respectively by the rods in opposite directions to each other. This allows a stationary common contact to be selectively connected to stationary selection contacts.

The above and other objects, features and advantages of the present invention will become apparent from the following detailed description taken with the accompanying drawings.

DESCRIPTION OF THE PREFERRED EMBODIMENTS

While the mechanical high-speed microwave switch of the present invention is susceptible of numerous physical embodiments, depending upon the environment and requirements of use, substantial numbers of the herein shown and described embodiments have been made, tested and used, and all have performed in an eminently satisfactory manner.

Figure 1:
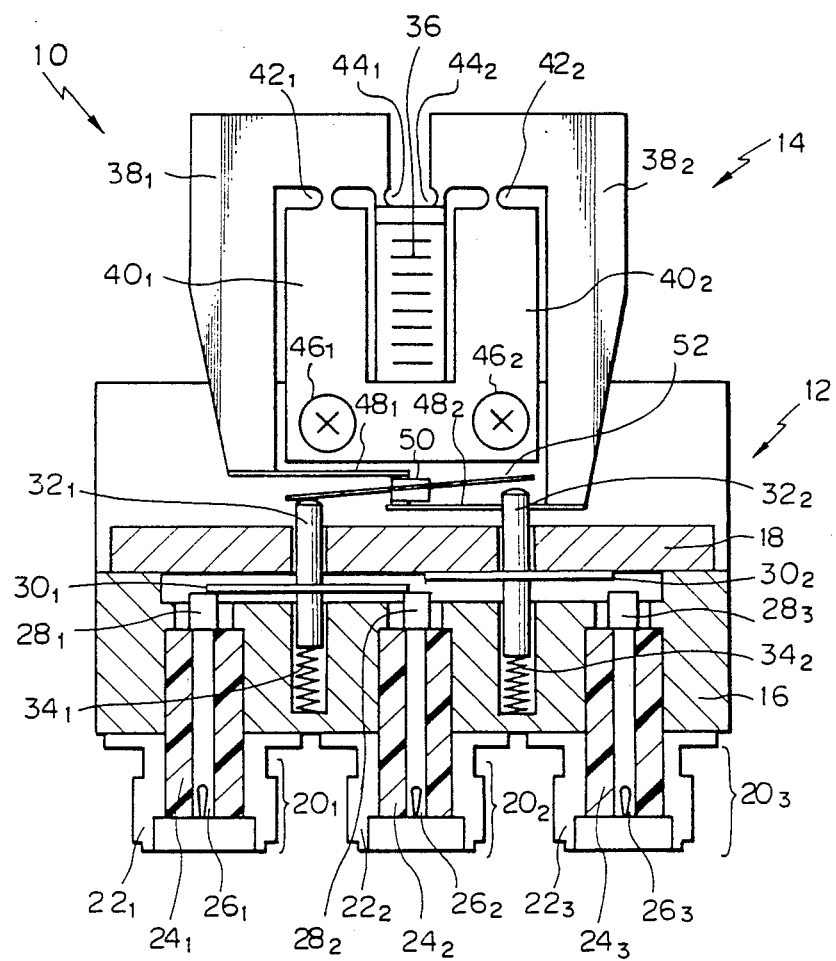
FIG. 1 is a plan view of a microwave switch embodying the present invention.

Referring to FIG. 1, a microwave switch embodying the present invention is shown and generally designated by the reference numeral 10. It will be noted in FIG. 1 that for easier description that part of the switch through which a microwave signal is routed (hereinafter referred to as a microwave switching mechanism) is shown in a sectional view.

The microwave switch 10 generally comprises a microwave switching mechanism 12, and an electroexpansive actuator 14 for driving the mechanism 12. The microwave switching mechanism 12 includes a switch body 16 which bifunctions as an external condutor of a transmission line, and a cover 18 which is associated with the switch body 16 and also bifunctions as an external conductor. Coaxial connectors $20_1$, $20_2$ and $20_3$ to which signals to be switched are routed are mounted in the switch body 16. As shown, the coaxial connector $20_1$ comprises a shell $22_1$, an insulator $24_1$, and a center conductor $26_1$. Likewise, the coaxial connectors $20_2$ and $20_3$ comprise respectively shells $22_2$ and $22_3$, insulators $24_2$ and $24_3$, and center conductors $26_2$ and $26_3$. In the microwave switching mechanism 12, the tips of the center conductors $26_1$, $26_2$ and $26_3$ are led to stationary contacts $28_1$, $28_2$ and $28_3$, respectively. While the stationary contact $28_2$ serves as a central common terminal, the stationary contacts $28_1$ and $28_3$ serve as selection terminals located at opposite sides of the common terminal $28_2$. The stationary contacts $28_1$ and $28_2$ are selectively bridged by a movable center conductor $30_1$ and the stationary contacts $28_2$ and $28_3$ by a movable center conductor $30_2$, as will be described. The center conductor $30_1$ is carried by a movable rod $32_1$ and the center conductor $30_2$ by a movable rod $32_2$. The rods $32_1$ and $32_2$ in turn are constantly biased upwardly by coil springs $34_1$ and $34_2$, respectively. In this construction, before a force is applied to the rod $32_1$ or $33_2$ from the outside, the center conductor $30_1$ or $30_2$ associated with the rod is held in pressing contact with the underside of the cover 18, or inner wall of the external conductor, by the action of the coil spring $34_1$ or $34_2$. In FIG. 1, such a position is represented by the central conductor $30_2$.

The actuator 14 adapted to actuate the switching mechanism 12 comprises an electroexpansive element 36 whose length is axially variable responsive to a voltage applied thereto, levers $38_1$ and $38_2$ coactive to magnify the displacement of the electroexpansive element 36, stators $40_1$ and $40_2$ to which one end of the electroexpansive element 36 is fixed, support or fulcrum hinges $42_1$ and $42_2$ which provide respectively the fulcrums for the rotation of the levers $38_1$ and $38_2$, and transmission hinges $44_1$ and $44_2$ for transmitting the displacement of the electroexpansive element 36 to their associated levers $38_1$ and $38_2$. The electroexpansive element 36 is a piezoelectric ceramic such as lead-zirconate-titanate, and electrostrictive ceramic, for example, lead-manganate-niobate. The stators $40_1$ and $40_2$ respectively are fastened to the switch body 16 by screws $46_1$ and $46_2$, although such fastening means is only illustrative. The lever $38_1$ carries at its tip a flexible leaf spring $48_1$ and the lever $38_2$ a flexible leaf spring $48_2$. The leaf springs $48_1$ and $48_2$ extend toward each other but in tiers from their associated levers $38_1$ and $38_2$. A connecting member 50 for interconnecting the leaf springs $48_1$ and $48_2$ is located subtantially at the intermediate between the levers $38_1$ and $38_2$. The leaf springs $48_1$ and $48_2$ extending out from their associated levers $38_1$ and $38_2$ are fixed to the connecting member 50 in such a relation that they develop moments in a couple. That is, they are fixed to the connecting member 50 in staggered positions such that the vectors are equal in magnitude but opposite in direction and that the vectors are parallel to each other but not aligned in point of force. A leaf spring 52 is also fixed to the connecting member 50 to serve as a member for transmitting a displacement and a force from the actuator 14 to the switching mechanism 12, while bifunctioning to magnify an angular displacement of the connecting member 50 due to its length.

The microwave switch 10 having the above described construction will be operated as follows.

In FIG. 1, the switch 10 is shown in a first position in which the electroexpansive element 36 has not unergone any significant displacement. The leaf spring 52 is shown as forcing the rod $32_1$ downwardly at the left of the connecting member 50 and remaining clear of the other rod $32_2$ at the right of same. In this condition, the left stationary contact, or selection terminal, $28_1$ is connected to the central stationary contact, or common terminal, $28_2$ by the movable center conductor $30_1$, while the right selection terminal $28_3$ and the common terminal $28_2$ form an open circuit. In the closed circuit at the left of the member 50, the transmission path extending from the connector $20_1$ to the movable center conductor $30_1$ via the stationary contacts $28_1$ and $28_2$ has a predetermined characteristic impedance and sets up a path which involves a minimum of discontinuity. The contact engaging pressure needs to be confined to a certain range which ensures reliable engagement of the contacts and, yet, reduces wear thereof. In this particular embodiment, the engaging pressure per contact is one half the value produced by subtracting the forces of the coil springs $34_1$ and $34_2$ from the force resulting from a displacement of the leaf spring 52.

At the open circuit side where the rod $32_2$ and the leaf spring 52 are spaced apart from each other, the movable center conductor $30_2$ is held in pressing contact with the external conductor (specifically the underside of the cover 18) by the coil spring $34_2$. In this switch 10, the prerequisite is that the center conductor $30_1$ or $30_2$ be grounded as just mentioned; grounding it provides a significant degree of isolation because the nongrounded movable contact serves as a cutoff waveguide.

When the switch 10 is inverted from the position shown in FIG. 1, the following sequence of events will occur. As a voltage is applied to the electroexpansive element 36 in the condition of FIG. 1, the axial length of the element 36 varies. Assuming that the element 36 has expanded in the axial direction to increase the length, the element 36 raises the levers $38_1$ and $38_2$ from below through the hinges $44_1$ and $44_2$ with the result that the levers $38_1$ and $38_2$, which respectively are restrained by the support hinges $42_1$ and $42_2$, are each caused into a rotational motion about their associated support hinges. At this instance, since the distance between the support hinge $42_1$ or $42_2$ and the tip of the lever $38_1$ or $38_2$ which carries the leaf spring $48_1$ or $48_2$ therewith is longer than the distance between the transmission hinge $44_1$ or $44_2$ and the support hinge $42_1$ or $42_2$, the insignificant displacement of the element 36 is converted to a significant displacement of the tips of the levers $38_1$ and $38_2$.

Upon the expansion of the electroexpansive element 36, the levers $38_1$ and $38_2$ move toward each other. As a result, the leaf springs $48_1$ and $48_2$ on the levers $38_1$ and $38_2$ develop moments in a couple around the connecting member 50 tending to become parallel to each other, thereby causing the connecting member 50 to rotate. As the rotation of the connecting member 50 continues, the leaf springs $48_1$ and $48_2$ are deformed to generate forces which tend to cancel the moments in a couple. The leaf spring 52 adapted to urge the rods $32_1$ and $32_2$ rotates integrally with the connecting member 50 so that it pulls up the rod $32_1$ at the left and pushes down the rod $32_2$ at the right.

Figure 2:
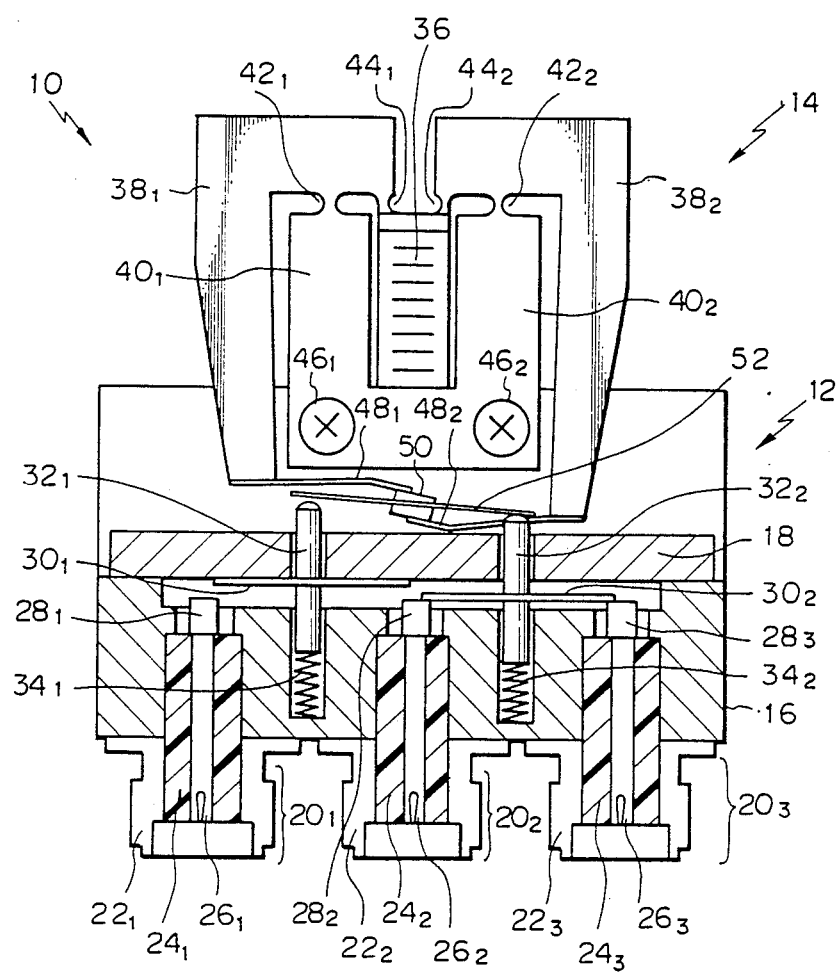
FIG. 2 shows the microswitch of FIG. 1 in another position.

In FIG. 2, the microwave switch 10 is shown in a position which is provided by the above-described sequence of events, that is, fully inverted from the position of FIG. 1. In this second position, the distance between the levers $38_1$ and $38_2$ has been reduced to rotate the connecting member 50 due to the resulting moments in a couple and, at the same time, the leaf spring 52 has been raised at the left clear of the rod $32_1$ and lowered at the right to push down the rod $32_2$. Therefore, the circuit between the common terminal $28_2$ and the right selection terminal $28_3$ is closed and the circuit between the common terminal $28_2$ and the left selection terminal $28_1$ is opened, as opposed by the condition of FIG. 1.

As described above, the microwave switch 10 in accordance with the present invention is actuated by the electroexpansive actuators 14 and, thereby, attains various unprecedented advantages. Power consumption and, therefore, heat generation in a steady state may be considered substantially zero. Since the resonance frequency of the mechanical energy transmission system between the electrostrictive element 36 and the movable rods $32_1$ and $32_2$ is high, the switching time is far shorter than in the case with an electromagnetic actuator. In fact, the switching time is not longer than 1 millisecond which is not greater than one tenth of that of a switch which is operated by an electromagnetic actuator. The high resonance frequency is derived from the fact that a piezoelectric element itself shows fast response and the hinges $42_1$, $42_2$, $44_1$ and $44_2$, levers $38_1$ and $38_2$, and the like each have a large spring constant. Further, as described in relation to the embodiment, the construction is simple and reliable.

The switch 10 in accordance with the present invention is appliable not only to the microwave band as described but also to higher frequencies or to lower frequencies lower than the VHF band. Also, various modifications are possible for those skilled in the art as some of them will be described hereinafter.

Figure 3:
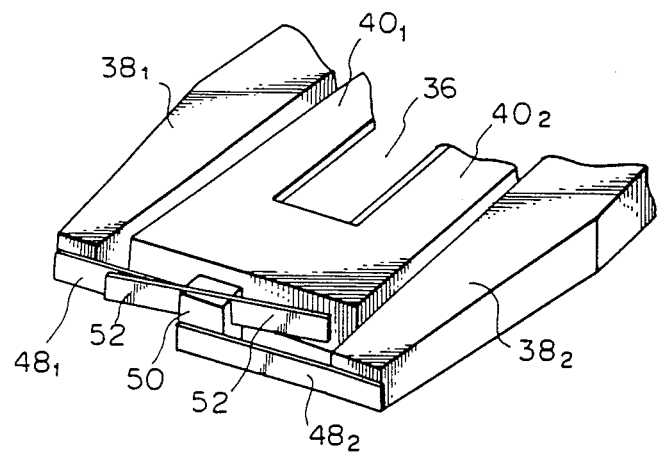
FIG. 3 is a fragmentary perspective view of the microswitch of FIG. 1.

Referring to FIG. 3, the microwave switch 10 of FIG. 1 is shown in a fragmentary perspective view. As shown in FIG. 3, the leaf springs $48_1$ and $48_2$ adaped to interconnect their associated levers $38_1$ and $38_2$ and the connecting member 50 and the leaf spring 52 adapted to drive the movable rods $32_1$ and $32_2$ in accordance with the particular embodiment of FIGS. 1 and 2 are staggered relative to each other in a direction perpendicular to the drawing of FIG. 1. This is to prevent the leaf springs $48_1$ and $48_2$ from interfering with the movement of the leaf spring 52 for actuating the movable rods $32_1$ and $32_2$. In some cases, however, such an arrangement of the leaf springs $48_1$ and $48_2$ and the leaf spring 52 may be undesirable due to torsional forces acting on the leaf springs $48_1$ and $48_2$.

Figure 4:
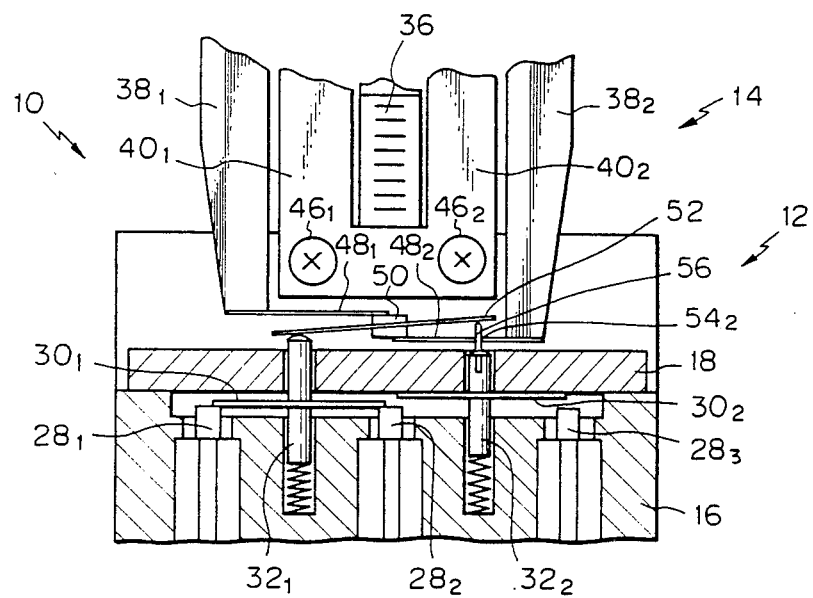
FIG. 4 is a plan view of another embodiment of the present invention.
Figure 5:
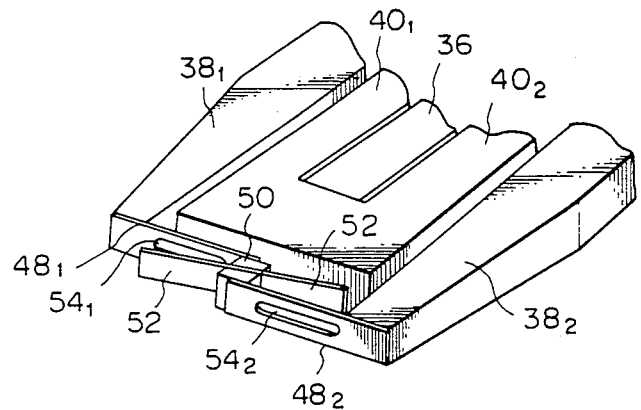
FIG. 5 is a fragmentary perspective view of the microwave switch shown in FIG. 4.

Referring to FIGS. 4 and 5, another embodiment of the present invention is shown. In these drawings, the same or similar structural elements as those shown in FIGS. 1–3 are designated by like reference numerals. As shown in FIG. 5, the leaf spring $48_2$ is provided with a slot $54_2$ so that the movable rod $32_2$ may pass through the slot $54_2$ to abut against the leaf spring 52. As seen in FIG. 4, the rod $32_2$ which is to pass through the slot $54_2$ includes a reduced diameter portion. While the reduced diameter portion comprises a metal rod 56 in the illustrative embodiment, such an implementation is merely for illustration and it may be provided integrally with the rest of the rod $32_2$ by molding plastics. As shown in FIG. 5, the other leaf spring $48_1$ which does not need to pass the rod $32_1$ therethrough is also provided with a slot $54_1$ merely to match the leaf spring $48_1$ with the leaf spring $48_2$ in rigidity and, therefore, it is not essential. If desired, each of the leaf springs $48_1$ and $48_2$ may be implemented by a pair of separate plates, instead of the single plate, so that the associated movable rod can pass through a spacing between the two plates.

Modifications to the section where a change in the distance between the levers $38_1$ and $38_2$ of the electrostrictive actuator 14 is converted to a rotational motion of the leaf spring 52 will be described. The crux of this particular section is that a change in the distance between the levers $38_1$ and $38_2$ is transmitted by the leaf springs $48_1$ and $48_2$ to the connecting member 50 so as to develop moments in a couple in the latter. Thus, various modifications are conceivable. First, a change in the distance between the levers $38_1$ and $38_2$, whether in a decreasing direction or in an increasing direction, can develop moments in a couple; a displacement in any of the two directions may be utilized. The connecting member 50 and the leaf spring 52 for urging the movable rods $32_1$ and $32_2$ and leaf springs $48_1$ and $48_2$ may be interconnected in any of various possible configurations some of which are shown in FIGS. 6–10.

Figure 6:
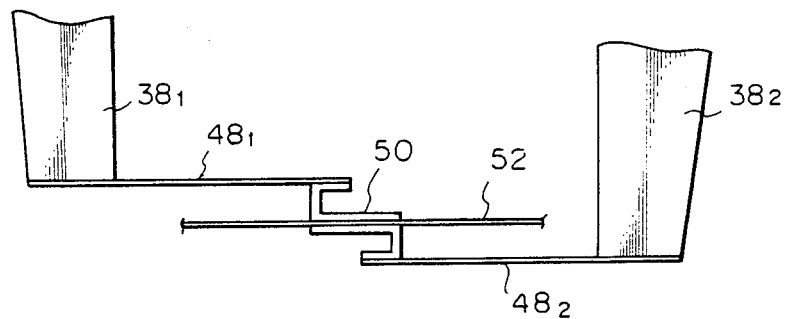
FIGS. 6–9 are plan views of specific examples of a connecting member included in the microwave switch of the present invention.
Figure 7:
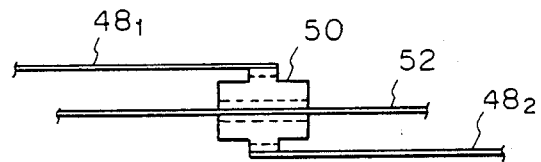
Figure 10:
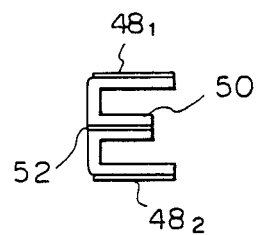
FIG. 10 is a side elevation of the connecting member shown in FIG. 7.

In FIG. 6, the connecting member 50 is provided by shaping a relatively thick plate, while the leaf spring 52 is welded to the connecting member 50. Specifically, two plates hold the leaf spring 52 therebetween and the leaf spring 52 is welded to edge portions of the plates. The connecting member 50 shown in FIG. 7 is also constructed using relatively thick plates. As best shown in FIG. 10, which is a side elevation of the member 50 of FIG. 7, two plates each having a generally U-shaped section hold the leaf spring 52 therebetween, while the leaf springs $48_1$ and $48_2$ respectively are rigidly connected to the ends of the shaped plates. Various other configurations using plates are applicable to the connecting member 50 insofar as they are capable of developing moments in a couple in the connecting member 50 as has been discussed.

Figure 8:
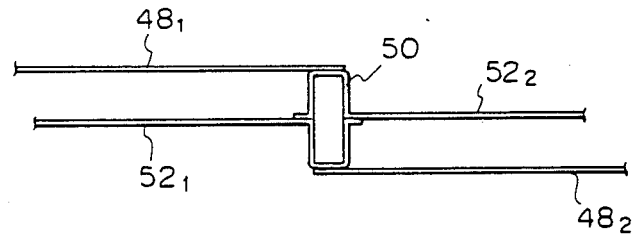
Figure 9:
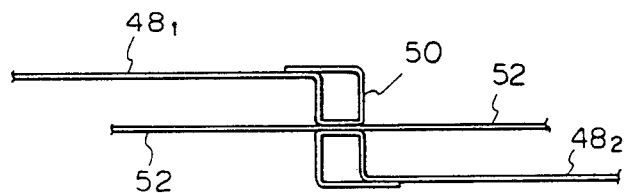

The configurations shown in FIGS. 8 and 9 are commonly directed to reducing the number of necessary parts. In FIG. 8, the connecting member 50 is provided by bending end portions of leaf springs $52_1$ and $52_2$ adapted to urge the rods $32_1$ and $32_2$ and then connecting them together in a point-symmetrical relationship as shown, the leaf springs $48_1$ and $48_2$ being connected to the connecting member 50. In FIG. 9, the end portions of the leaf springs $48_1$ and $48_2$ are bent to provide the connecting member 50 with the leaf spring 52 held between the bent portions, thereby interconnecting the leaf springs simultaneously with the shaping of the connecting member 50.

In the particular embodiments described above, the means for developing moments in a couple in the connecting member 50 actuated by the levers $38_1$ and $38_2$ has been implemented by the leaf springs $48_1$ and $48_2$, because the use of leaf springs is easiest and provides the best result. If desired, however, the leaf springs may be replaced with plastic members, wires or the like so long as they are flexible. Likewise, the leaf springs 52, $52_1$ and $52_2$ adapted to transmit the rotation of the connecting member 50 to the movable rods $32_1$ and $32_2$ may be replaced with plastic members or wires, for example. The gist is that a change in the distance between the levers should be transformed into a rotational motion of the connecting member 50.

Figure 11:
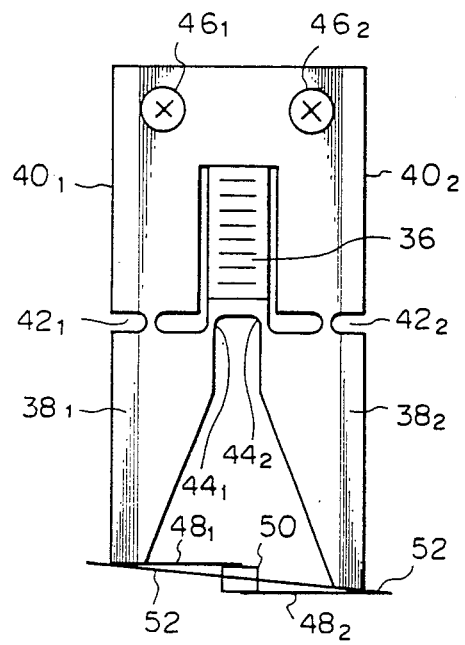
FIGS. 11 and 12 are plan views showing specific examples of an electroexpansive actuator included in the microwave switch of the present invention.

The levers $38_1$ and $38_2$ in the above embodiments have each been provided with an L-shape. This is merely for a compact switch design and any alternative shape may be employed insofar as it allows the distance between the levers $38_1$ and $38_2$ to vary responsive to a displacement of the electroexpansive element 36. Another embodiment concerned with the configuration of the levers $38_1$ and $38_2$ is shown in FIG. 11. In FIG. 11, the levers $38_1$ and $38_2$ each extend straight and parallel to each other without being bent in an L-shape and carries the leaf springs $48_1$ and $48_2$ at their tips. The leaf springs $48_1$ and $48_2$, as well as the leaf spring 52, are connected to the connecting member 50. In this construction, a displacement of the electroexpansive element 36 is magnified by the levers $38_1$ and $38_2$ about the support hinges $42_1$ and $42_2$ to in turn vary the distance between the lever tips, with the result that moments in a couple develop in the connecting member 50 through the leaf springs $48_1$ and $48_2$ to rotate the leaf spring 52 and, thereby, actuate the rods $32_1$ and $32_2$. In the illustrative embodiment of FIG. 11, when the electroexpansive element 36 is displaced in an expanding direction, the levers $38_1$ and $38_2$ will be displaced away from each other causing the connecting member 50 to rotate counterclockwise.

Figure 12:
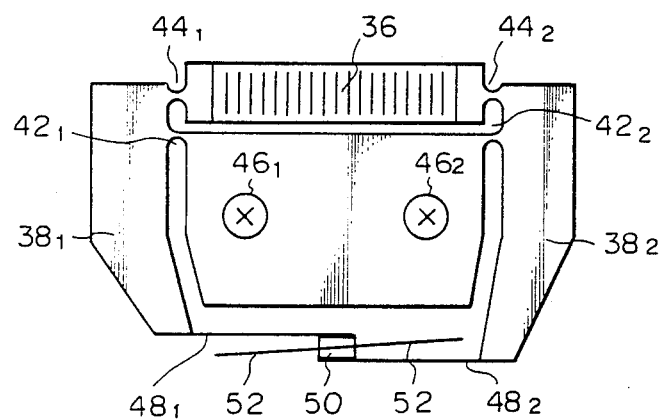

The actuator 14 in the switch 10 is characterized in that a displcement of its electroexpansive element 36 is transmitted to the connecting member 50 by the levers $38_1$ and $38_2$ to develop moments in a couple which causes it to rotate. Various methods other than those shown and described are conceivable for implementing such a characteristic feature. In another embodiment which is shown in FIG. 12, the electroexpansive element 36 is in a position rotated 90 degrees relative to the element 36 in the foregoing embodiments. Such an alternative construction will also be effective to transmit a change in the length of the element 36 to the leaf springs $48_1$ and $48_2$ through the levers $38_1$ and $38_2$ so as to totate the connecting member 50.

Concerning the drive of the switching section 12 from the actuator 14 side, too, various other method may be elaborated. In the particular embodiments shown and described, an arrangement is made such that the electroexpansive actuator 14 urges the rods $32_1$ and $32_2$ by means of the leaf spring 52 so as to actuate the center conductors $30_1$ and $30_2$. The rods $32_1$ and $32_2$ in turn cause the center conductors $30_1$ and $30_2$ into engagement with the stationary contacts $28_1$ and $28_2$ to set up closed circuits. While the rods $32_1$ and $32_2$ are not urged by the leaf spring 52, they are urged by the coil springs $34_1$ and $34_2$ as shown in FIGS. 1 and 2 to in turn press the conductors $30_1$ and $30_2$ against the wall of the conductor of the strip line, thereby providing high isolation. In another possible arrangement, the function of the coil springs $34_1$ and $34_2$ may be assigned to the leaf spring 52, as shown in FIG. 13.

Figure 13:
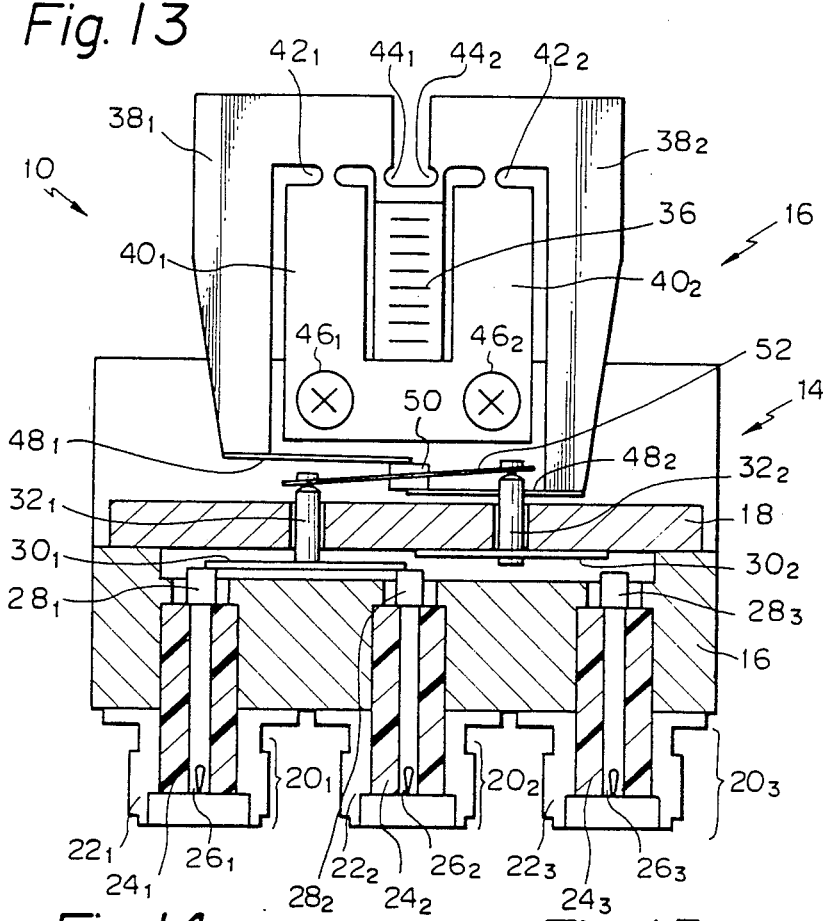
FIG. 13 is a plan view of another embodiment of the present invention.

Referring to FIG. 13 showing a third embodiment of the present invention, the switch lacks the coil springs and, instead, holds the movable rods $32_1$ and $32_2$ in engagement with the leaf spring 52. The engagement of the rods $32_1$ and $32_2$ with the leaf spring 52 is shown in detail in FIGS. 14 and 15. As shown, each of the rods $32_1$ and $32_2$ has a reduced diameter portion adjacent to the top and an enlarged head $58_1$ or $58_2$ at which the reduced diameter portion terminates. The leaf spring 52, on the other hand, is bifurcated at opposite ends to have slots 60 which receive the heads $58_1$ and $58_2$, respectively.

Figure 14:
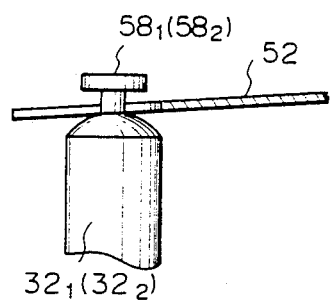
FIG. 14 is a fragmentary enlarged plan view of the microwave switch shown in FIG. 13.
Figure 15:
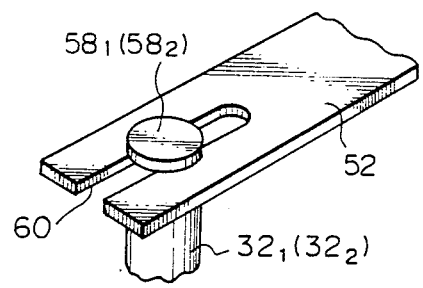
FIG. 15 is a fragmentary enlarged perspective view associated with FIG. 14.

The switch shown in FIGS. 13–15 operate in substantially the same manner as in the foregoing embodiments so far as that side where the leaf spring 52 pushes down the rod $32_1$ or $32_2$ to press the associated conductor $30_1$ or $30_2$ against the stationary contacts $28_1$ or $28_3$ and $28_2$ is concerned, except that the resulting load is lighter complementarily to the omission of the coil springs. Meanwhile, the leaf spring 52 at the other side of the connecting member 50, where it has been non-loaded in the foregoing embodiments, has to to pull up the rod $32_1$ or $32_2$ so as to press the conductor $30_1$ or $30_2$ against the inner wall of the external conductor, thus bearing the load. Hence, the total load which the actuator 14 in FIG. 13 bears is substantially equal to the load developing in the foregoing embodiments.

In summary, it will be seen that the present invention provides a mechanical high-speed microwave switch which realizes a remarkable cut-down in power consumption and switching time, thereby contributing a great deal to power saving in communications equipments. Further, the shorter switching time promotes the application of the microswitch to digital communication systems.

What is claimed is:

1. A microwave switch for selectively connecting a first selection terminal and a second selection terminal to a common terminal, comprising:
   a first stationary selection contact and a second stationary selection contact which respectively constitute the first and second selection terminals;
   a stationary common contact constituting the common terminal which is located between said first and second stationary selection contacts;
   a first movable center conductor and a second movable center conductor located respectively between said common contact and said first selection contact and between said common contact and said second selection contact for shorting the stationary common contact and one of the first and second selection contacts;
   a first movable rod and a second movable rod for carrying respectively said first and second center conductors;
   an electroexpansive element which is variable in length responsive to a voltage applied from the outside;
   a first lever and a second lever, each having a first and a second end, and being connected said electroexpansive element at said first end for magnifying a displacement of said electroexpansive element;
   a first flexible member and a second flexible member mounted respectively on said second ends of the first and second levers in parallel to and opposing each other with the end of one flexible member adjacent the end of the other flexible member;
   a connecting member for connecting said adjacent ends of said first and second flexible members and being displaceable in a rotational motion responsive to a displacement of the flexible members; and
   a moveable rod driving member for moving the first and second movable rods in opposite directions to each other responsive to the rotational motion of said connecting member.

2. A microwave switch as claimed in claim 1, wherein the common contact, the selection contacts, the center conductors and the movable rods constitute a microwave switching mechanism, while the electroexpansive element, the levers, the flexible members, the connecting member and the movable rod driving member constitute an electroexpansive actuator.

3. A microwave switch as claimed in claim 1, further comprising a switch body and a cover member which also serve as an external conductor of a transmission line.

4. A microwave switch as claimed in claim 3, further comprising at least three coaxial connectors mounted in said switch body.

5. A microwave switch as claimed in claim 4, wherein each of said coaxial connectors comprises an insulator buried in the switch body, a center conductor extending in a central portion of said insulator to make contact with any of said stationary contacts, and a shell surrounding that portion of the insulator which is exposed to the outside of the switch body.

6. A microwave switch as claimed in claim 1, further comprising a first urging member and a second urging member for urging respectively the first and second movable rods toward the movable rod driving member.

7. A microwave switch as claimed in claim 6, wherein each of said urging members comprises a coil spring.

8. A microwave switch as claimed in claim 1, wherein each of the first and second movable rods is engaged with the movable rod driving member at an end of said rod.

9. A microwave switch as claimed in claim 1, further comprising stators for fixing one end of the electroexpansive element in place, a first support hinge and a second support hinge each providing a fulcrum about which the first or the second lever associated with said support hinge is movable, and a first transmission hinge and a second transmission hinge for transmitting a displacement of the electroexpansive element to the first and second levers.

10. A microwave switch as claimed in claim 1, wherein the first and second flexible members comprise first and second leaf springs, respectively.

11. A microwave switch as claimed in claim 10, wherein the movable rod driving member comprises a first leaf spring and a second leaf spring, said first and second leaf springs associated with the flexible members and said first and second leaf springs associated with the movable rod driving member being arranged in tiers.

12. A microwave switch as claimed in claim 10, wherein at least one of the first and second leaf springs is provided with a slot for allowing one of the movable rods to pass through said slot.

13. A microwave switch as claimed in claim 1, wherein the movable rod driving member comprises a first leaf spring and a second leaf spring.

14. A microwave switch as claimed in claim 13, wherein the connecting member comprises those end portions of the first and second leaf springs which are connected to each other.

15. A microwave switch as claimed in claim 10, wherein the connecting member comprises bends provided at said adjacent end portions of the first and second leaf springs.

* * * * *